United States Patent [19]

Sankaran

[11] Patent Number: 5,133,902
[45] Date of Patent: Jul. 28, 1992

[54] TRANSESTERIFICATION OF TRIGLYCERIDES

[76] Inventor: Viswanatha Sankaran, 6A D'Silva Rd., Madras 600004

[21] Appl. No.: 569,410

[22] Filed: Aug. 17, 1990

Related U.S. Application Data

[62] Division of Ser. No. 396,933, Aug. 22, 1989, Pat. No. 4,966,876.

[51] Int. Cl.$^5$ ................................................ C11C 3/02
[52] U.S. Cl. ..................................................... 554/169
[58] Field of Search ....................................... 260/410.7

[56] References Cited

U.S. PATENT DOCUMENTS

| 2,442,536 | 6/1948 | Eckey ................................ | 426/601 |
| 2,733,251 | 1/1956 | Hawley et al. .................. | 260/410.7 |
| 3,809,709 | 5/1974 | Muller et al. .................... | 240/410.7 |

FOREIGN PATENT DOCUMENTS 160248  11/1984  India .

Primary Examiner—Jose G. Dees
Assistant Examiner—Deborah D. Carr
Attorney, Agent, or Firm—D. Peter Hochberg; Mark Kusner; Louis J. Weisz

[57] ABSTRACT

A process for converting liquid triglycerides into solid triglycerides by means of random transesterifications achieved through the use of catalytically active combinations comprising the reaction product of mixtures of dihydric and trihydric alcohols with mixtures of alkali metal hydroxides, and with ketones. The catalytically active materials can be employed in directed transesterifications in which the transesterification reaction mixture is subjected to a series of heating and cooling cycles during which higher melting fats are formed and precipitated from solution, causing an equilibrium shift that results in the formation and precipitation of still additional higher melting fats. An especially desirable catalytically active combination comprises the reaction product of 1, 2 propanediol, 1, 3 propanediol and glycerol, with sodium hydroxide and potassium hydroxide, and in a preferred embodiment, the reaction product is combined with acetone to form the catalytically active combination.

3 Claims, No Drawings

TRANSESTERIFICATION OF TRIGLYCERIDES

This is a division of application Ser. No. 396,933, filed Aug. 22, 1989, now U.S. Pat. No. 4,966,876.

TECHNICAL FIELD

This invention relates to the preparation of triglyceride mixtures that display increased solid content at ambient temperatures. More particularly, this invention relates to methods for converting liquid triglycerides to solid triglycerides through treatment with novel combinations that display catalytic transesterification activity. Specifically, this invention relates to the treatment of liquid triglycerides with alkali metal polyalkoxides formed by the reaction of certain alkali metal hydroxides with certain polyhydric alcohols, to form solid triglycerides.

BACKGROUND OF THE INVENTION

Fats and oils are universally used throughout the world as food substances, and in fact, they constitute approximately 25% to 50% of the caloric intake of mankind. Such materials comprise esters of glycerol with a variety of fatty acids, termed glycerides, and as such, the materials are characterized both by their ester linkages, and by their degree of unsaturation. Fats, which are differentiated from oils solely by the fact that fats are solid, or semisolid at room temperatures, whereas oils are liquids, occur in fruits and seeds of plants, as well as in animal tissue. The higher fatty acids with which the glycerol portion is esterified comprise both saturated and unsaturated acids. Saturated fatty acids tend to result in glycerides having higher melting points, as do fatty acids of higher molecular weight. Unsaturated fatty acids, usually vegetable-derived, and the lower molecular weight fatty acids normally have lower melting points.

Due in part to their relatively high amounts of unsaturates, however, liquid edible oils are particularly susceptible to rancidity caused by oxidation which produces a complex mixture of volatile aldehydes, ketones, and acids. While the oxidative process can be retarded to some extent, for example, by stabilization with antioxidants which inhibit oxidation, solid fats in many instances enjoy greater popularity, not only because they have a relatively long shelf life, but also because they are capable of repeated heating without undergoing oxidative degradation. Solid fats can be shipped more readily, and they are also adapted to uses where only solid fats can be used, for instance, as spreads for breadstuffs and the like.

In the past, solid triglycerides have been produced by the hydrogenation of oils carried out commercially, for example, by bubbling hydrogen gas through oils containing a suspension of finely divided nickel metal. In the process, the double bonds of oleic, linoleic, linolenic, and eleostearic glycerides in the oil are converted into the hard, waxy tristearin. By controlling the amount of hydrogen added, solids of different consistencies may thus be obtained.

In recent year, however, it has been discovered that in humans, saturated triglycerides are converted into cholesterol that is subsequently deposited as plaque on the walls of blood vessels. The deposition of plaque results in the constriction of the blood vessels, making them more susceptible to blockage caused by the clotting which occurs from time-to-time in the bloodstream. Sudden blockage of these constrictions by clots is a major cause of frequently fatal heart attacks and strokes throughout the world. For this reason, as well as its cost, hydrogenation processing of the type described is now frequently recognized to be undesirable.

In an effort to avoid such disadvantages, transesterification, sometimes termed interesterification, has been suggested as a method for converting liquid oils into solids. In the past, transesterifications have been carried out under anhydrous conditions using sodium methoxide as a catalyst. In the presence of methoxide ions, the various acids attached by ester linkages to the glycerol are randomly exchanged between the triglyceride molecules very rapidly. Since the acids are evenly distributed in nature, treatment with methoxides provides a random distribution of the acids among the triglycerides, resulting in the formation of some that are solid.

Since removal of one of the products of a reversible reaction results in an equilibrium shift, removal of the solid triglycerides by means of selective crystallization causes the reaction to generate still more of the removed component. The process is sometimes referred to as a "directed" interesterification. Directed interesterification processes can be used to produce triglyceride mixtures having an extensive solid content, from liquid oils, without destroying the double bond initially present in the starting material.

Unfortunately however, methoxide catalysts commonly show a tendency to interact with the triglycerides with which they are employed, producing methyl esters which can hydrolyze to form the poisonous methyl alcohol.

To avoid this problem, a different process has been proposed in Indian patent 160,248. There, the process of converting edible oils into solid fats without hydrogenation is accomplished by treating the oils with sodium propylene glycoxide. This catalyst, which produces the desired transesterification, eliminates the possible formation of deleterious substances, and is readily removed following the transesterification by a simple water treatment.

Although the transesterification thus achieved produces the desired solid triglyceride product, the process would be even more desirable if the reaction rate could be accelerated.

BRIEF DISCLOSURE OF THE INVENTION

In view of the preceding, therefore, it is a first aspect of this invention to provide a method for converting liquid edible oils into solid fats.

A second aspect of this invention is to provide a method for converting liquid edible oils into solid fats without impairment of the oils' unsaturated nature.

It is an additional aspect of this invention to provide transesterification catalysts that can be used to convert liquid glycerides, particularly triglycerides, into solid substances.

A further aspect of this invention is to furnish transesterification catalysts that do not pose health hazards when employed to transesterify edible triglycerides.

Still another aspect of this invention is to provide transesterification catalysts that have improved activity and which, therefore, promote more rapid transesterification reactions.

The preceding and additional aspects of this invention are provided by a catalytically active combination comprising polyalkoxides formed by the reaction of a plurality of 3-carbon polyhydric alcohols having at least two of their carbons attached to hydroxyl groups, with a plurality of alkali metal hydroxides.

The preceding and other aspects of the invention are provided by a catalytically active combination comprising (1) the reaction product of a first mixture containing at least one dihydric alcohol and glycerol, with a second mixture of sodium hydroxide and potassium hydroxide, and (2) acetone.

The preceding and further aspects of the invention are provided by a transesterification catalyst comprising a combination of alkali metal propylene di, and trialkoxides, together with a ketone.

The preceding and still additional aspects of the invention are provided by a transesterification catalyst comprising the reaction product of a first mixture of at least one dihydric alcohol and glycerol, with a second mixture comprising sodium hydroxide and potassium hydroxide, wherein on a molar basis, said glycerol constitutes from about 5% to about 10% of said first mixture, and wherein on a molar basis, from about 10% to about 25% of said second mixture is potassium hydroxide, and wherein further, sufficient of said second mixture is present to react with substantially all of the primary hydroxyl groups present in said first mixture.

The preceding and yet further aspects of the invention are provided by the process of solidifying liquid triglycerides by heating them in a reaction mixture in the presence of a transesterification-promoting combination comprising alkali metal propylene di, and trialkoxides, together with a ketone, thereafter cooling said mixture to a temperature at which desired triglycerides solidification occurs, and thereafter, sequentially heating and cooling the reaction mixture in cycles sufficient in number to produce the degree of solidification of the reaction mixture desired.

DETAILED DESCRIPTION OF THE INVENTION

The invention comprises the discovery that the combination of 1, 2, 3 propanetriol, glycerol, with propanediols, and reaction of such mixture with alkali metal hydroxides, for instance, sodium hydroxide and potassium hydroxide, desirably followed by the combination of the reaction product thus formed with a ketone, provides a catalytically active combination much more effective as a catalyst than when, for example, propylene glycol, i.e., 1, 2 propanediol, is employed to form a sodium propylene glycoxide catalyst.

The presence of the 1, 2, 3 propanetriol also results in formation of the desired alkali metal polyoyloxide at lower temperatures than when a propanediol alone is present.

While not wishing to be bound by the theory, it is possible that the enhanced catalytic activity results both from the presence of the two primary hydroxyl groups present in the triol, as well as by the fact that the larger ionic radius of the potassium atom, compared to the sodium atom, makes it more reactive than sodium atoms by themselves. The ketone apparently acts as an accelerator, making the catalytically active combination even more unusually efficient in promoting the transesterification of the liquid triglycerides with which the invention is primarily concerned.

Certain advantages have also been found in combinations which include mixtures of propanediols, that is, those that include both the 1, 2 propanediol as well as the 1, 3 propanediol, together with the glycerol.

Irrespective of the nature of the catalytic mechanism, it has been determined that when the components of the catalytically active combination are present together with the triglycerides to be transesterified, a unique, synergistic action is obtained, greatly facilitating the more rapid solidification of edible oils into solid fats, thus assuring economies of processing equipment.

The polyalkoxides, also sometimes known as polyalcoholates, are prepared, for example, by adding sodium hydroxide and potassium hydroxide in a dry, solid form, preferably as a powder, to the mixture of polyhydric alcohols, and agitating the heated reaction mixture under vacuum until the desired polyalkoxide has been formed.

The polyhydric alcohols will include dihydric alcohols such as 1, 2 propanediol and 1, 3 propanediol, preferably, both of such alcohols, in combination with the glycerol. It has been found, however, that the presence of too many primary hydroxyl groups in the mixture tends to promote the formation of emulsifying substances, rather than the desired catalyst. In this regard, experience has shown that it is desirable for the glycerol to be present on a molar percent basis in an amount from at least about 5% to about 10% of the total polyhydric alcohols present. The upper limit will be governed by the nature of the triglycerides to be transesterified, the amount of emulsifier formation that can be tolerated, and similar considerations.

The balance of the polyhydric alcohols used to form the polyalkoxides will preferably constitute a mixture of 1, 2 propanediol with 1, 3 propanediol. In the preferred embodiment, on a molar basis, the 1, 2 propanediol will constitute from about 20% to 60% of the total polyhydric alcohols present, while the 1, 3 propanediol will make up from about 30% to 70% of the mixture, with the balance being glycerol. In a particularly preferred embodiment, the ratio of the 1, 2 propanediol, the 1,3 propanediol, and the 1, 2, 3 propanediol will be in the molar ratio of about 5:4:1.

Mixtures of alkali metal hydroxides which include potassium hydroxide have been found to be especially useful in preparing the catalytically active combinations of the invention, with mixtures of sodium hydroxide and potassium hydroxide being particularly preferred. The use of at least about 10% to about 25%, on a molar basis, of potassium hydroxide in such mixtures has been found to assure formation of particularly active catalytically active combinations.

With respect to the ratio of alkali metal hydroxides to the polyhydric alcohols used to form the catalyst combinations, the use of too much hydroxide tends to result in the saponification of the triglycerides, and is consequently undesirable. The use of too little of the alkali metal hydroxide mixtures, on the other hand, results in insufficient interaction of the hydroxides with the polyhydric alcohols. Consequently, it is desirable that a sufficient amount of the alkali metal hydroxides be used to react with substantially all of the primary hydroxyl groups present in the alcohols. Since the amount of primary hydroxyl groups will depend upon the kinds and ratio of the polyhydric alcohol components present, the amount of alkali metal hydroxide will vary; however, the appropriate amount may be readily calculated for particular reaction circumstances.

Preparation of the polyalkoxides typically requires from about 30 to 60 minutes. While the reaction is exothermic, the jelly-like mass produced in the course of the reaction is desirably heated to about from 100° C. to 120° C. to assure substantially complete reaction, and is vigorously agitated under vacuum until the reaction product forms a viscous liquid from which substantially all of the water vapor formed during the reaction has been eliminated. Typically, from about 30 to 60 minutes are required to produce the desired polyalkoxide.

Upon completion of the reaction, a ketone is preferably added to the polyalkoxide to complete the catalytically active combination. Various ketones may be used, including aliphatic ketones such as acetone, diethylketone, and others. However, acetone is particularly preferred for purposes of the invention.

The amount of ketone employed may vary, although the presence of too little of the material results in reduced catalytic activity, while the use of too much is wasteful since it fails to provide a commensurate degree of catalytic activity. Normally, from about 0.1% to about 0.5% of the ketone, based on the weight of triglycerides to be transesterified, is preferred.

The process of interesterification is carried out by adding the catalyst to the triglycerides to be transesterified, and thereafter heating the mixture with vigorous stirring until random interesterification has been completed.

Normally, the triglycerides are refined, for example, by treatment with alkaline materials designed to form soaps with any free acids present, thereby further helping to avoid rancidity. Thereafter, the catalytically active combination comprising a polyalkoxide of the invention, together with a suitable ketone, is added to initiate the transesterification.

The amount of catalyst required may be varied; however, typically from about 0.1% to about 5%, based on the weight of triglycerides to be transesterified, are added. More preferably, from about 0.1% to about 1% of the catalyst combination is combined with the triglycerides to initiate the reaction.

The temperature of the transesterification reaction mixture is ordinarily controlled at from about 40° C. to about 90° C. during the reaction. About 10 to 30 minutes is required to carry out the transesterification reaction, with the heat of the reaction mixture being raised to about 85° C. during the latter stages of the reaction to assure a substantially complete reaction.

Following the random transesterification, a directed transesterification is desirably carried out. During this part of the process, the reaction mixture is alternately cooled and reheated, causing the higher melting triglycerides to solidify during each of the cooling steps. The equilibrium of the transesterification is thereby shifted, promoting formation of still additional amounts of higher melting triglyceride solids, which then leave solution. The heating-cooling cycling is continued until the degree of solidification possible, or desired is achieved.

During the cooling period of the cycling procedure described, the reaction mixture is lowered, for example, to from about 0° C. to about 10° C., where it is maintained for up to about one hour.

The heating portion of the cycle follows the cooling period, with the reaction mixture being heated to from about 15° C. to about 20° C., where it is held for from two to three hours.

Cycling between cooling and heating is continued for from about 2 to about 12 cycles, 6 being typical, to achieve the desired degree of solidification.

Following completion of the directed interesterification, the reaction mixture is combined with hot water, normally at or near the boiling point, to destroy the catalyst. Catalyst destruction is achieved through hydrolysis of the polyalkoxides, resulting from their reaction with the water to form soaps and free alcohols. Washing with hot water is usually continued until substantially all such materials are removed.

Thereafter, the temperature of the reaction mixture is increased until the solid triglycerides present are remelted, after which the product may be deodorized, for instance, by being stripped with steam. If desired, the product may also be bleached, for example, by contact with activated carbon, and dried as by the application of heat and vacuum.

Following its refining, the hot reaction mixture may be deposited in suitable containers for cooling, where it solidifies in the process, or it may be converted into margarine by being blended with emulsifiers, milkfats, lecithins and suitable additives, and then solidified by cooling.

While the catalytically active combinations described are particularly useful when the random transesterification is followed by the directed transesterification as described, the directed transesterification portion of the procedure may be eliminated if desired. Palm oil, for instance, has a tendency to continue to crystalize when it is incorporated in margarines, resulting in undesirable properties in the margarine. Use of the catalyst combinations of the invention allow the problem to be circumvented simply by randomly interesterifying the palm oil, making it suitable for incorporation in soft margarines. In like manner, confectionery fats can be produced by the co-randomization of palm kernel oil, actinodaphne hookeri fat, sal fat and the like.

The catalysts and processes described are particularly useful in connection with the solidification of oils, or blends of oils having 20% or more saturated fatty acids including such oils as palm oil, palm stearine, palm kernel oil, cottonseed oil, mahua oil, mowrah fat or illipe butter, soy stearine, peanut oil, coconut oil, and the like. Additional triglycerides including corn oil, hydrogenated oils, refined lards, and others may also be processed by the methods described.

The following examples, while not intended to be limiting in nature, are illustrative of the invention.

The alkali polyalkoxides employed in the examples are prepared in a stainless steel vessel provided with stainless steel heating coils and equipped for vacuum operation. To the vessel are added the polyhydric alcohols 1, 2 propanediol; 1, 3 propanediol; and 1, 2, 3 propanediol. A series of experiments are run in which the ratio of the 1, 2 propanediol to the 1, 3 propanediol, on a molar basis, ranges from 1/3.5 to 2/1, respectively. The 1, 2, 3 propanediol constitutes about 10%, on a molar basis, of the total polyhydric alcohols present. To the mixture is added a dry powdered blend of sodium hydroxide and potassium hydroxide, the latter comprising about 10% to 25% on a molar basis of the total hydroxides present. A sufficient stoichiometric amount of the alkali metal hydroxides are added to react with all the primary hydroxyl groups present in the polyhydric alcohol mixture. The addition is accompanied by vigorous stirring, to assure thorough mixing of the hydroxides in the polyhydric alcohols. The reaction mixture generates considerable heat due to its exothermic nature, and gradually assumes a jelly-like appearance. The mixture is subsequently heated to about 120°, accompanied by continued vigorous stirring until it becomes a viscous liquid. Throughout the reaction, which requires from about 10 to 30 minutes to accomplish, the vessel is maintained under a vacuum to eliminate water vapor generated by the reaction.

To the polyalkoxides thus formed, a sufficient amount of acetone is added to constitute about 0.5%, on a weight basis, of the oils to be transesterified.

Following preparation of the catalytically active combination as described, the oil, or mixture of oils to be esterified is added to a separate stainless steel vessel provided with agitation means and jacketed so that it can be heated or cooled, as desired. In the examples, sufficient of the catalytically active combination is added to the oils so that the polyalkoxides present constitute from about 0.1% to 5.0% of the oils to be transesterified. The transesterification reaction mixture is then heated for from between 40° C. and 90° C. with vigorous stirring for about 10 to 30 minutes, the temperature reaching from 85° C. to 90° C. by the end of the procedure, a point at which the random transesterification has been substantially completed.

Thereafter, the randomly interesterified oil is rapidly cooled, e.g., in less than 10 minutes, preferably without about 2 to 3 minutes, to a temperature of from about 5° C. to 10° C. During the cooling process, crystallization occurs, resulting in the desolublization of the higher melting triglycerides. The reaction mixture is maintained at the cooling temperature described for about 1 hour, after which the mixture is heated to about 15° C. to 20° C. for a period of approximately 2 to 3 hours. The cycle is then repeated, i.e., the reaction mixture is again cooled, resulting in the desolublization of still more of the higher melting triglycerides formed during the second heating period. The heating/cooling cycles are repeated until substantially no more crystallization takes place.

The following Table 1 lists the results of a number of random interesterification reactions. The temperatures shown are those at which the interesterification reaction takes place, while the time shown indicates the period required to reach a point at which no more triglycerides are precipitated from solution.

TABLE 1

| Example | Catalyst | Time (mins.) | Temp. (°C.) | Triglyceride Treated |
|---|---|---|---|---|
| 1 | Potassium trialkoxide | 90 | 95 | 50/50 (volume) palm oil/cottonseed oil |
| 2 | Sodium 1,2 propylene dialkoxide | 45 | 90 | 50/50 (volume) palm oil/cottonseed oil |
| 3 | Sodium 1,3 propylene dialkoxide | 30 | 85 | 50/50 (volume) palm oil/cottonseed oil |
| 4 | Sodium/Potassium 1,2 propylene dialkoxide/ 1,3 propylene dialkoxide/ 1,2,3 propylene trialkoxide | 20 | 80 | 50/50 (volume) palm oil/cottonseed oil |
| 5 | Sodium/potassium 1,2 propylene dialkoxide/ 1,3 propylene dialkoxide/ 1,2,3 propylene trialkoxide with 0.5% by weight of acetone based on the weight of triglycerides present | 15 | 75 | 50/50 (volume) palm oil/cottonseed oil |

It is evident from the results that Example 4, involving sodium/potassium 1, 2 propylene dialkoxide/1, 3 propylene dialkoxide 1, 2, 3 propylene trialkoxide, that even with lower temperatures, significantly less time is required to complete the random transesterification reaction as evidenced by the fact that no further precipitation occurs, thus confirming interactive synergism between the catalytic components. In Example 5, the inclusion of acetone shows even further synergistic enhancement with the mixed alkoxides of the invention, compared to catalysts in which a single alkali metal, in combination with only one polyhydric alkoxide is employed.

Table 2 Illustrates the results of a series of directed transesterifications. The column headed total cooling-/reaction cycle indicates the total elapsed time of the cooling and heating periods making up the cycles to which the previously randomly esterified oils have been subjected. The "slip point" is the temperature at which the product produced by the procedure is able to pass through the slip test funnel opening. The catalyst employed in the directed interesterification is the sodium/-potassium 1, 2 propylene diolalkoxide/1, 3 propylene diolalkoxide/1, 2, 3 propylene trialkoxide catalyst, combined with acetone, described in connection with example 5.

TABLE 2

| Example | Triglyceride | Total cooling/reaction cycle time (hrs.) | Slip Point (°C.) | Physical Appearance |
|---|---|---|---|---|
| 1 | Cottonseed oil | 13 | 38 | Plastic solid resembling hydrogenated shortening |
| 2 | Peanut oil | 51 | 33 | Grainy solid dispersed in grainy liquid |
| 3 | Cottonseed oil/ Peanut oil (70/30) | 27 | 38 | Plastic solid resembling hydrogenated shortening |

TABLE 2-continued

| Example | Triglyceride | Total cooling/reaction cycle time (hrs.) | Slip Point (°C.) | Physical Appearance |
| --- | --- | --- | --- | --- |
| 4 | Cottonseed oil/ Peanut oil (50/50) | 72 | 39 | Plastic solid resembling hydrogenated shortening |
| 5 | Cottonseed oil/ Safflower oil (70/30) | 120 | 36.5 | Plastic solid resembling hydrogenated shortening |
| 6 | Mahua oil | 4 | 39.5 | Plastic solid resembling hydrogenated shortening |
| 7 | Mahua oil | 1 | 36 | Plastic solid resembling hydrogenated shortening |
| 8 | Rice bran oil/ Cottonseed oil (50/50) | 48 | 40 | Plastic solid resembling hydrogenated shortening |
| 9 | Lard | 2 | 46 | Hard, plastic fat |
| 10 | Hardened palm oil/ Palm kernel oil (50/50) | ½ | 32 | Plastic fat |

It will be appreciated from the preceding that a wide variety of customized fats having the slip points, plasticities, and other physical characteristics desired can be prepared through use of the randomized and directed interesterification procedures described, in connection with the catalytically active combinations taught. Fats so prepared have the advantage of providing the physical characteristics desired, while retaining the desirable degree of unsaturation originally present.

While in accordance with the patent statutes, a preferred embodiment and best mode has been presented, the scope of the invention is not limited thereto, but rather is measured by the scope of the attached claims.

What is claimed is:

1. The process of solidifying liquid triglycerides by heating the triglycerides in a reaction mixture containing them in the presence of a transesterification-promoting combination comprising alkali metal propylene di, and trialkoxides, together with a ketone, thereafter cooling said mixture to a temperature at which desired triglyceride solidification occurs, thereafter sequentially heating and cooling the reaction mixture in cycles sufficient in number to produce the degree of solidification of the reaction mixture desired.

2. The process of claim 1 in which the transesterification-promoting combination comprises (1) the reaction product of a first mixture comprising a mixture of 1, 2-propanediol; 1, 3-propanetriol; and glycerol, with a second mixture comprising sodium hydroxide and potassium hydroxide, and (2) a ketone.

3. The process of transesterifying triglycerides with a transesterification catalyst comprising heating said triglycerides in the presence of the reaction product of a first mixture of dihydroxy alcohols, and glycerol, with a second mixture comprising sodium hydroxide and potassium hydroxide, wherein on a molar basis, said glycerol constitutes from about 5% to about 10% of said first mixture, and wherein on a molar basis, from about 10% to about 25% of said second mixture is potassium hydroxide, and wherein further, sufficient of said mixture is present to react with substantially all of the hydroxyl groups present in said first mixture.

* * * * *